United States Patent
Ringot

(10) Patent No.: US 6,469,720 B1
(45) Date of Patent: Oct. 22, 2002

(54) ELECTRONIC DEVICE COMPRISING A SCREEN AND METHOD OF DISPLAYING SHORT MENUS

(75) Inventor: Nicolas Ringot, Le Mans (FR)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 09/427,823

(22) Filed: Oct. 27, 1999

(30) Foreign Application Priority Data

Oct. 30, 1998 (FR) .............................................. 98 13699

(51) Int. Cl.⁷ .................................................. G09G 5/00
(52) U.S. Cl. ........................ 345/829; 345/785; 345/830
(58) Field of Search ................................ 345/815, 845, 345/864, 830, 764, 824, 829, 858, 857, 784–788

(56) References Cited

U.S. PATENT DOCUMENTS

| | | | |
|---|---|---|---|
| 5,761,610 A | 6/1998 | Sorensen et al. | 455/89 |
| 5,786,819 A * | 7/1998 | Weiser et al. | 345/840 |
| 5,856,827 A * | 1/1999 | Sudo | 345/810 |
| 6,219,051 B1 * | 4/2001 | Furuya | 345/784 |
| 6,300,967 B1 * | 10/2001 | Wagner et al. | 345/784 |
| 6,370,518 B1 * | 4/2002 | Payne et al. | 707/1 |

FOREIGN PATENT DOCUMENTS

EP 0792056 A2 8/1997 ............ H04M/1/72

* cited by examiner

*Primary Examiner*—Raymond J. Bayerl
*Assistant Examiner*—Tadesse Hailu
(74) *Attorney, Agent, or Firm*—Dicran Halajian

(57) ABSTRACT

An electronic device includes a screen for displaying displayed lines of a set of lines. A controller allows scrolling up and down the set of lines and to select a selected line of the displayed lines. Selecting the first or last of the displayed lines, scrolls the set of lines so that there is a line displayed above or below the selected line. Thus, the first and last displayed lines are not highlighted on the screen.

18 Claims, 3 Drawing Sheets

ELECTRONIC DEVICE COMPRISING A SCREEN AND METHOD OF DISPLAYING SHORT MENUS

FIELD OF THE INVENTION

The present invention relates to an electronic device comprising:
- a screen on which a plurality of short menus are to be displayed,
- scrolling means for scrolling said short menus upward and/or downward
- conspicuous means for selecting one of said menus.

The invention also relates to a method of displaying short menus.

BACKGROUND OF THE INVENTION

Such devices are well known and find many applications, notably in the field of portable telephones. A problem posed with this type of devices is that they have to be of a small size because they are to be held in hand, as a result of which it is impossible to display on a single screen all the items of a menu that may have many items.

U.S. Pat. No. 5,761,610 describes such a device that permits to display. There is proposed to create sub-menus derived from main menus. This causes the user to maneuver commands of these menus very often.

SUMMARY OF THE INVENTION

The present invention proposes a device of the type defined in the opening paragraph in which means are provided for facilitating the perception of these short menus that may be displayed.

For this purpose, such a device is characterized in that the selected menu occupies such a position that it allows the perception of at least one upward or downward short menu.

The idea of the invention is that the user perceives the short menus before and after they have been shown, so that the user feels more comfortable before validating a short menu. This comfortable feeling has been verified by the applicants by means of tests.

BRIEF DESCRIPTION OF THE DRAWINGS

These and other aspects of the invention are apparent from and will be elucidated, by way of non-limiting example, with reference to the embodiment(s) described hereinafter.

In the drawings.

DESCRIPTION OF PREFERRED EMBODIMENTS

Figure 1:
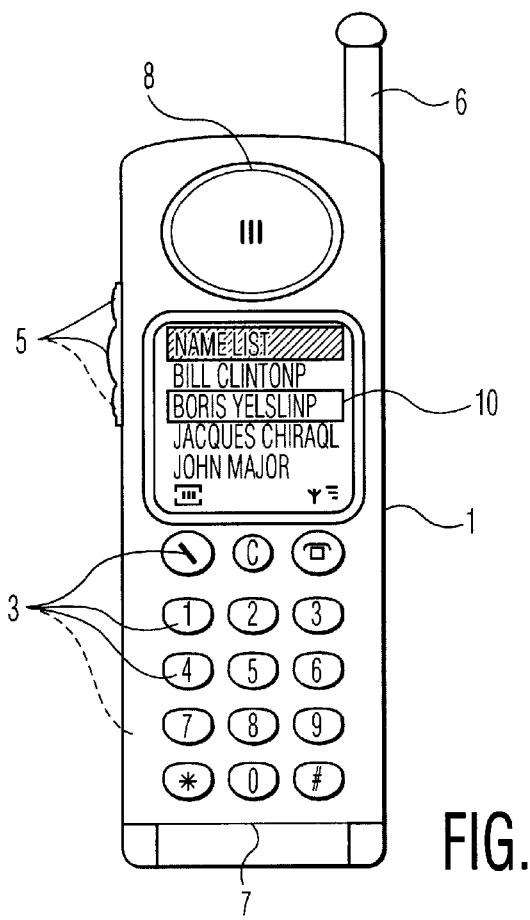
FIG. 1 shows a device according to the invention.

In FIG. 1 is shown an electronic device according to the invention. This device is formed by a housing 1 on which are positioned a keyboard 3, a set of keys 5, an antenna 6, a microphone 7, an earphone 8 and a display 10 on which some information is made perceptible to the user.

Figure 2:
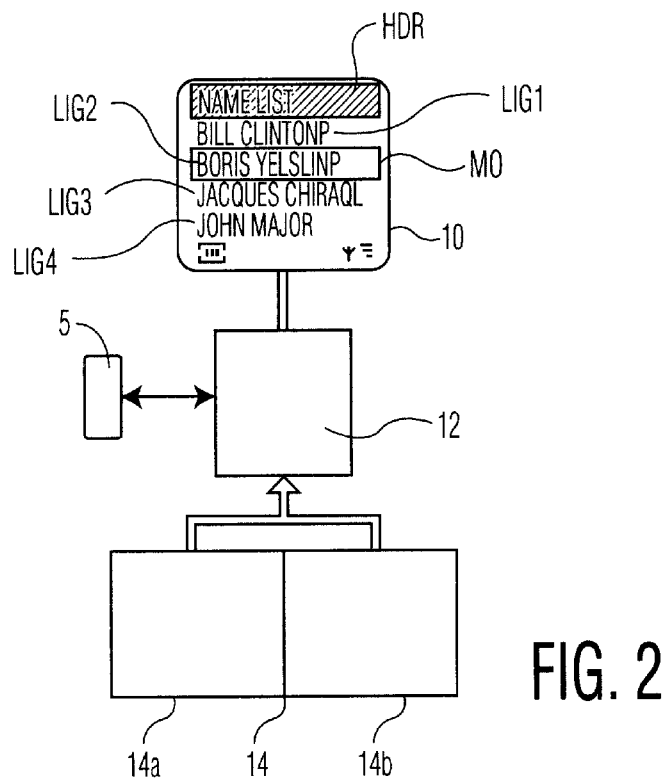
FIG. 2 shows the diagram of the embodiment of the device of FIG. 1.

FIG. 2 shows this display 10 with its associated display controller 12 that permits the use of various screen configurations. These configurations are produced on the basis of information coming from a memory 14 associated to this controller 12. This memory has a part 14a which is the random-access memory and a part 14b in which are stored, on the one hand, the control instructions that define the screen configuration 10 and, on the other hand, short menus of the menus to be displayed under the control of the keys 5. Lines of short menu items LIG1, LIG2, LIG3 and LIG4 placed underneath a line of a short menu header HDR are shown on the screen. For distinguishing itself from item lines, this line HDR is put in the inverse mode, that is to say, that the characters are in a different color from that of the characters of the item lines. The item line that is likely to be validated is shown in the Figure by a frame around it MO. Under the control of the keys 5 it is possible to scroll the various item lines upward and downward. Upward is considered to be towards the top of the screen and downward towards the bottom of the screen.

According to the invention, a short menu is shown in a position that always leaves at least one upward or downward short menu visible.

Figure 3:
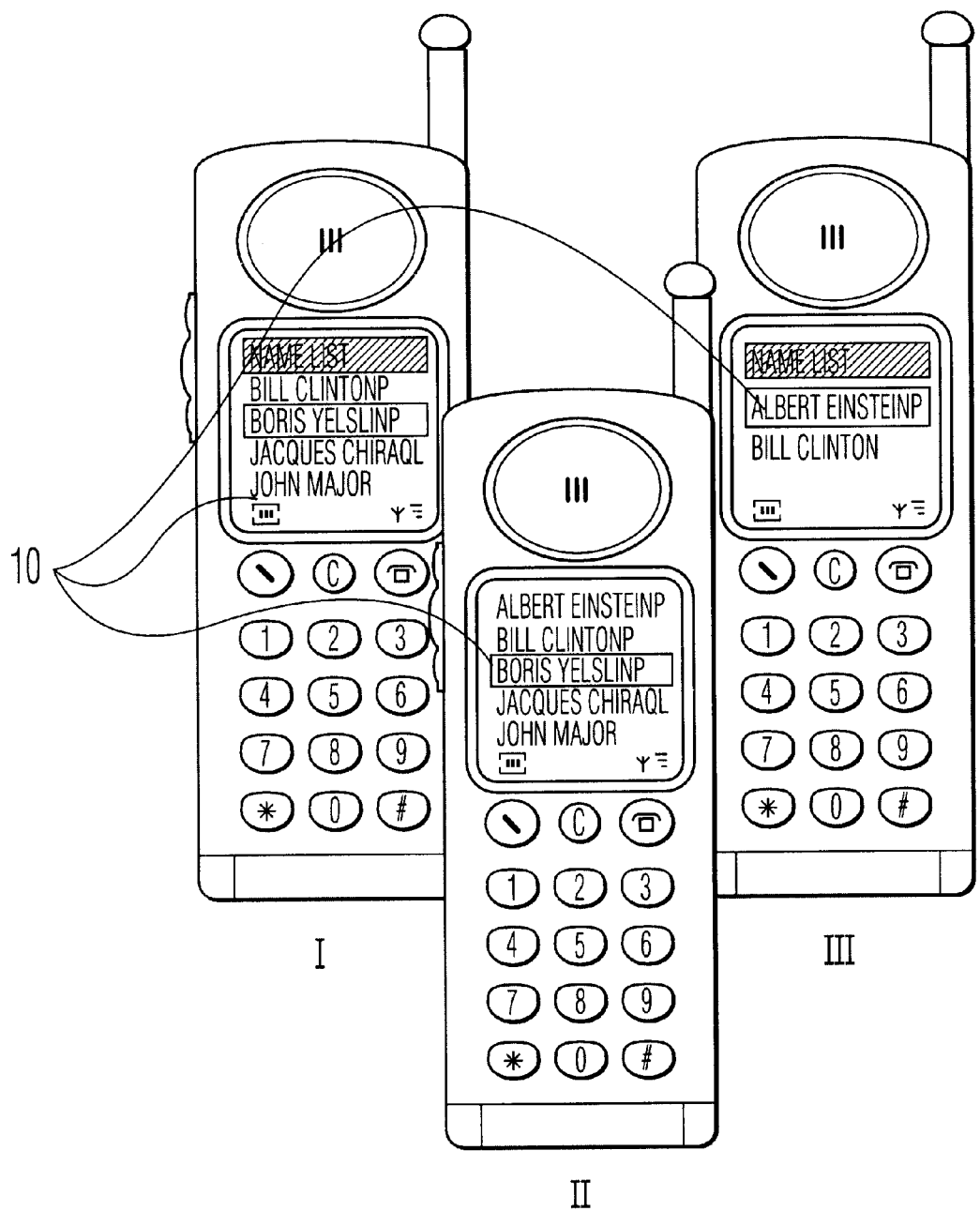
FIG. 3 shows various configurations of the screen according to the invention.

FIG. 3 shows three possible configurations of the display according to the variants of the invention.

Configuration I shows a first configuration in which there is a header and a plurality of lines of the short menu.

Configuration II shows the same screen as before, but without a header.

Configuration III shows the possibility of utilizing a ZOOM function. In the latter configuration, the header may also be suppressed so as to have more lines of a short menu visible.

Figure 4:
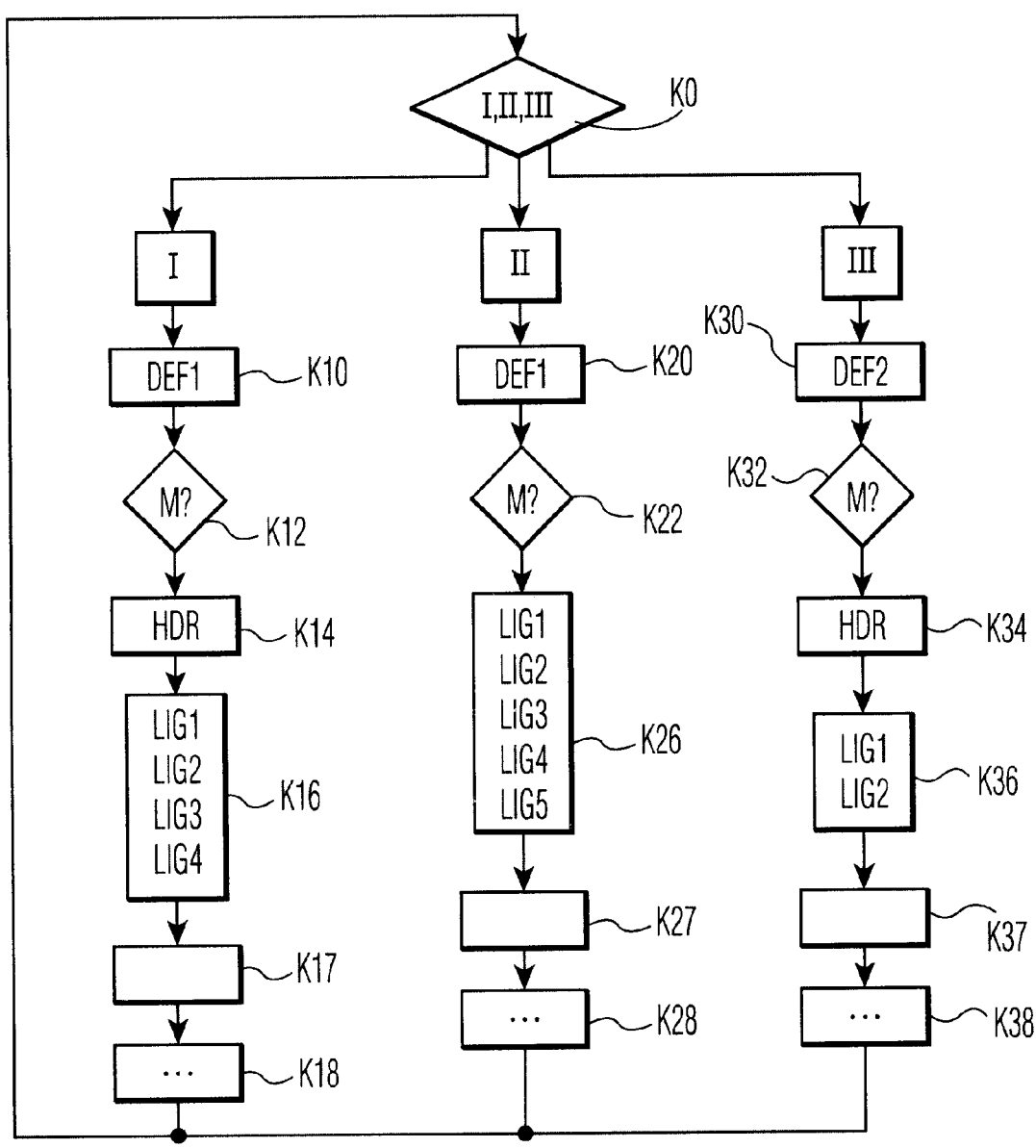
FIG. 4 shows a flow chart for explaining the operation of the invention.

FIG. 4 shows a flow chart formed by various boxes intended for the explanation of the operation of the screen controller 12 for the implementation of the invention.

Box K0 indicates the choice of the configurations chosen by the user. He makes this choice by manipulating the keys 5, for example.

If he chooses the configuration I, he proceeds to box K10. This configuration corresponds to a screen having a large number of lines; thus the screen controller is put to its maximum definition. The box K12 indicates the menu to be chosen by the user. In box K14 the header is displayed and in box K16 four lines of this menu, while other short menu lines of this menu may appear by scrolling them. The box K17 indicates the shown-line display and the box K18 indicates the action to be taken if a short menu has been validated.

If the user chooses the configuration II, he proceeds to box K20. This configuration also corresponds to a display comprising a large number of lines, while the display controller is put to its maximum definition. The box K22 indicates the menu to be chosen by the user. In box K26, five lines of this menu are displayed, since one line occupies the place of the header. There too, other short menu lines of this menu may appear by scrolling them. The box K27 indicates the shown-line display and the box K28 indicates the action to be taken if a short menu has been validated.

If the user chooses the configuration III, he proceeds to box K30. This configuration corresponds to a display comprising a small number of lines that occupy a large part of the screen (ZOOM function), whereas the screen controller is put to its minimum definition, that is to say, that a point to be displayed illuminates more pixels on the screen. The box K32 indicates the menu to be chosen by the user. In box K34 the header is displayed and in box K36 two lines of this menu, while other short menu lines of this menu may appear by scrolling them. The box K37 indicates the shown-line display, the box K38 indicates the action to be taken if a short menu has been validated.

What is claimed is:

1. An electronic device comprising:
   a screen on which displayed lines are to be displayed from a plurality of lines,
   scrolling means for scrolling said plurality of lines upward and/or downward, and
   conspicuous means for selecting one of said displayed lines,
   wherein selecting a first and a last one of said displayed lines scrolls said plurality of lines so that the selected line occupies such a position that it allows the perception of at least one upward or downward line, whereby a first displayed line and a last displayed line of said displayed lines are not highlighted.

2. A device as claimed in claim 1, wherein said lines include items of a menu and a header of said menu, and wherein a suppression command is provided for suppressing the header to display an additional item.

3. A device as claimed in claim 2, wherein a zoom command is provided for displaying enlarged lines on the screen.

4. A method of displaying said lines, implemented in a device as claimed in claim 1, wherein the method comprises:
   displaying of said lines from top to bottom of the screen, and
   selecting one of the lines while leaving one line readable either upward or downward.

5. A method as claimed in claim 4, further comprising scrolling of the lines.

6. An electronic device comprising:
   a screen for displaying displayed lines of a plurality of lines;
   a controller configured to scroll up and down said plurality of lines and to select a selected line of said displayed lines;
   wherein selecting a first or a last one of said displayed lines to highlight a selected line scrolls said plurality of lines so that a line is displayed above or below said selected line, whereby a first displayed line and a last displayed line of said displayed lines are not highlighted.

7. The electronic device of claim 6, wherein said plurality of lines include a menu header and menu items.

8. The electronic device of claim 6, wherein said displayed lines include a menu header and menu items.

9. The electronic device of claim 8, wherein said controller is configured to suppress said menu header so that an additional one of said menu items is displayed.

10. The electronic device of claim 6, wherein said controller is configured to provide a zoom command to enlarge said displayed lines.

11. The electronic device of claim 6, wherein said selected line of said displayed lines is highlighted by one of enclosing said selected line by a frame and displaying said selected line in inverse format relative to the rest of said displayed lines.

12. The electronic device of claim 11, wherein said lines include a menu header and menu items, said menu header being in said inverse format when selected, and one of said menu items being enclosed by said frame when selected.

13. A method of displaying a set of lines comprising:
   displaying displayed lines of a plurality of lines;
   selecting one of a first line and a last line of said displayed lines to form a selected line; and
   scrolling said plurality of lines so that a line is displayed above or below said selected line, whereby a first displayed line and a last displayed line of said displayed lines are not highlighted.

14. The method of claim 13, wherein said displayed lines include a menu header and menu items.

15. The method of claim 14, further comprising suppressing said menu header so that an additional one of said menu items is displayed.

16. The method of claim 13, further comprising zooming to enlarge said displayed lines.

17. The method of claim 13, further comprising highlighting said selected line by one of enclosing said selected line by a frame and displaying said selected line in inverse format relative to the rest of said displayed lines.

18. The method of claim 17, wherein said lines include a menu header and menu items, said menu header being in said inverse format when selected, and one of said menu items being enclosed by said frame when selected.

* * * * *